(12) United States Patent
Appa (10) Patent No.: US 6,190,484 B1
(45) Date of Patent: Feb. 20, 2001

(54) MONOLITHIC COMPOSITE WING MANUFACTURING PROCESS

(76) Inventor: Kari Appa, 22242 Anthony Dr., Lake Forest, CA (US) 92630-2327

( * ) Notice: Under 35 U.S.C. 154(b), the term of this patent shall be extended for 0 days.

(21) Appl. No.: 09/252,750

(22) Filed: Feb. 19, 1999

(51) Int. Cl.[7] ............................ B31C 13/00; B65H 81/00; B64C 3/00
(52) U.S. Cl. ...................... 156/189; 156/169; 156/172; 156/182; 156/184; 156/195; 156/425; 244/123
(58) Field of Search ................................ 156/166, 169, 156/172, 173, 182, 184, 185, 189, 195, 242, 245, 425; 244/123

(56) References Cited

U.S. PATENT DOCUMENTS

| | | | |
|---|---|---|---|
| 4,432,515 | * 2/1984 | Jarvineva | 244/123 |
| 4,565,595 | * 1/1986 | Whitener | 156/156 |
| 4,739,954 | * 4/1988 | Hamilton | 244/123 |
| 5,216,799 | * 6/1993 | Charnock et al. | 29/525.1 |
| 5,810,284 | * 9/1998 | Hibbs et al. | 244/13 |

* cited by examiner

Primary Examiner—Michael W. Ball
Assistant Examiner—Jessica Rossi (57) ABSTRACT

A method of manufacturing a monolithic composite wing without using mechanical fasteners is described. The process begins with the formation of a center wing box in combination with a pair of spars, riblets and a pair of skin-molds including the wrapping and binding of the box by means of resin impregnated composite tapes. Next, additional cells are adjoined contiguously on either side of the current framework and an overlap wrapping and bonding process is continued around the current framework. The overlap wrapping and binding procedure provides increased torsion stiffness and reduced structural weight. All cells up to the leading and trailing edges will be included in the assembly process. Conduits to convey fuel, hydraulic fluid and electrical wiring will also be installed in designated cells. Finally, the completed wing will be cured in an autoclave under uniform pressure and temperature.

3 Claims, 8 Drawing Sheets

MONOLITHIC COMPOSITE WING MANUFACTURING PROCESS

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

1. Field of Invention

This invention describes a manufacturing process for a monolithic composite wing, more particularly, that reduces manufacturing cost, increases structural strength, enhances structural integrity and reduces structural weight. In another manner of speaking, this invention provides an automated fabrication method that increases production rate and reduces the life cycle cost of the aircraft.

2. Description of Prior Art

Composite materials are made of thin fibers, not necessarily limited to carbon, boron or kevlar, imbedded in an epoxy like resin. These composite materials possess, generally speaking, a high strength to weight ratio. That means, a small amount of composite material can support large forces when properly used. Hence, composite materials play a significant role in aerospace industries as well as in other commercial products.

Heretofore, the aircraft wing manufacturing processes used mechanical fasteners and manual lay-up of composite fabrics. This process is referred to as the built-up fabrication methodology, wherein upper and lower skins are attached to a framework of spars and ribs by means of mechanical fasteners. The disadvantages of the built-up fabrication process are the involvement of extensive manual labor and the need to assemble a large number of parts. Another serious drawback of the built-up process is that the load transmission efficiency is very low, because, the mechanical fasteners induce large stresses leading to delamination and breakdown of structural members.

The prior art abounds with examples of composite wing manufacturing. A number of patents disclosing typical inventions pertinent to the present invention will now be presented.

U.S. Pat. No. 3,962,506 to Edumond O. Dunahoo (Jun. 8, 1976) discloses a method for manufacturing multi-chambered, airfoil shaped, composite helicopter blades. The essence of this innovation lies in forming an airfoil shaped blade adjoining a number of flexible composite tubes that are then expanded by pressurization. Once all the cellular tubes are adjoined, a final wrapping of all the tubes is performed. Helicopter blades mostly experience radial tension and the tubes proposed in this concept adequately provide the needed strength. However, the same fabrication process cannot be applied to manufacture aircraft wing structures because of higher bending and torsion stiffness requirements. This fabrication process does not provide sufficient torsion stiffness for aircraft wings. Moreover, it is not possible to inflate aircraft wing cells to conform to the airfoil shape. This is the major drawback of this method.

U.S. Pat. No. 4,662,587 to Philip C. Whitener (May 5, 1987) and U.S. Pat. No. 4,565,595 to Philip C. Whitener (Jan. 1, 1986) disclose methods of manufacturing composite aircraft wing structures. The construction details of the invention are as follows:

Fabrication of complex multi-element spar-skin joints,

Assembly of non-integral mandrels that are required to form the cells conforming to local cross sections of the wing, pre-fabrication of honeycomb spars, pre-fabrication of top and bottom skins, bonding of honeycomb spars and skins in a contiguously manner, contiguously assembled framework is then wrapped around by pre-impregnated fibrous materials, Pressurization of mandrels to apply pressure to the side walls and spars.

heating and curing the wing mold

Thus, the fabrication process involves a number of manual operations and hence precludes automation. A large number of fasteners are required to attach the skins to the honeycomb spars. This means, thicker skins and spars must be used to avoid excessive stress levels around fasteners. Other disadvantages are:

1. the structure is weak in torsion, because the skins and spars are joined by means of chemical glue that is weak in shear,
2. spar-skin joining process involves many elements and consequently many manual operations,
3. removable mandrels are required that increases manufacturing cost,
4. automation is applied only at the final wrapping and bonding process, while other operations involve intensive manual labor.

Hence, the art governed by the U.S. patent 4,565,595 yields a torsionally weaker structure and also increases manufacturing cost due to several manual operations in the wing assembly.

U.S. Pat. No. 5,216,799 to Paul Charnock et al., (Jun. 8, 1993) discloses a method of constructing a composite wing in which upper and lower skins are bonded to a preassembled framework of ribs and spars thus, obviating the need for metal fasteners and reducing assembly time. Essentially, this is the conventional approach used in the aerospace industry. No effort has been made to take advantage of composite fiber directional strength and minimum weight considerations. Hence, this invention falls short of being claimed as the economical one.

U.S. Pat. No. 5,735,486 to Matthias Piening, et al. (Apr. 7, 1998) discloses a method of constructing a wing comprising of upper and lower skins and spars wherein unidirectional stiffening members, called stringers, extending longitudinally, are mounted on the inside of the wing shells. The primary innovation lies in the construction of the stringers embedded into the wing shell. This fabrication process involves manual lay-up and assembly of numerous components.

U.S. Pat. No. 5,332,178 to Sam B. Williams (Jul. 26, 1994) discloses a method of fabricating a composite wing comprising of plurality of hallow triangular shaped spars arranged in juxtaposed parallel relation defining an airfoil with composite skins disposed about said assembled members. This is a novel concept except that it produces a non-optimal structure having a lower value of strength to weight ratio. Moreover, this construction results in lesser fuel volume and becomes difficult to manage the change in center of gravity as the fuel is dispensed in flight.

U.S. Pat. No. 5,496,002 to Rainer Schutze (Mar. 5, 1996) discloses a method of fabricating a wing comprising thin walled shells, pre-formed skins and circular rods as stringers. Thin walled shells of various diameters are arranged in such a manner as to fill the volume of the airfoil. In reality, this concept is a variation of another disclosure made in U.S. Pat. No. 5,332,178 to Sam B. Williams (Jul. 26, 1994). The disadvantages of this method are identical to those discussed above.

U.S. Pat. No. 4,538,780 to Richard D. Roe (Sep. 3, 1985) discloses a method for constructing ultra-light composite wing structures used in the design of missile fins and target drones. The fins are constructed from lightweight foam material and reinforced plastic skins. This approach does not apply to aircraft wing structures. It was with this knowledge of the foregoing state of technology that the present invention has been conceived and is now reduced to practice.

SUMMARY OF THE INVENTION

Figure 8:
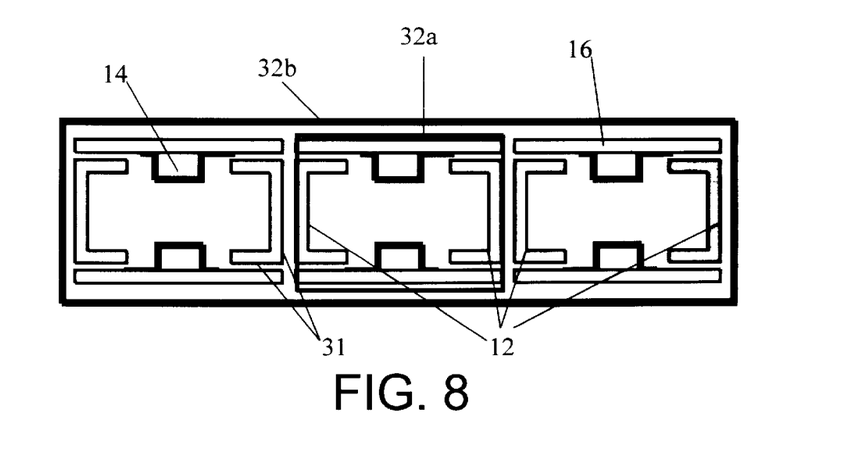
FIG. 8 shows a cross sectional view of a multi-cell wing box and the bonding process of multi-directional tapes and cells.

This invention describes a method of manufacturing monolithic composite wings without using mechanical fasteners. The fabrication process comprises the steps of:

1. Forming a spanwise elongated center wing box cell, (FIG. 3), using tapered U shaped spars and plurality of riblets placed between spars at various span stations, including a pair of contoured skin-molds glued to the upper and lower surfaces of the spar caps. The skin-molds may be made up of contoured honeycomb sheets or a combination of woven composite fabrics including integrally formed stiffeners. Said framework of cell serves the dual role of a mandrel that provides airfoil shape as well as a load bearing structural member.
2. Wrapping, local heating, compacting and bonding said center box (cell) by means of resin impregnated composite tapes along judiciously chosen directions in plurality of layers along the wing span. The number of layers and their directions are predetermined to comply with the bending and torsion strength requirements.
3. Assembling of additional boxes (cells) on either side of the center box as depicted in FIG. 8. The box (cell) assembly procedure follows the process described in step 1.
4. Overlap wrapping, local heating, compacting and bonding process described in step 2 continues including previously completed box (FIG. 8).
5. Contiguous assembling of additional boxes disposed laterally according to steps 3 and 4 continues until the leading edge and the trailing edge boxes are included in the wing assembly. Thus, the overlap wrapping and bonding process of successive boxes provides excellent torsion and bending stiffness, and renders a truly monolithic wing manufacturing process without using mechanical fasteners.
6. Assembling of conduits to convey fuel, hydraulic fluid and electrical services,
7. Spraying of fuel leak proof bonding compounds around wetted surfaces of the fuel cells,
8. Laying reinforcement tapes around inspection cutouts to provide safety features against crack and delamination,
9. Curing of the wing in an autoclave under constant pressure and temperature, and
10. Cleaning and inspecting the finished wing.

The advantages of this invention over the prior arts are:
1. full automation of the wing assembly that reduces manufacturing cost,
2. increased structural strength to weight ratio, and
3. increased structural durability and integrity.

Still, further objects and advantages will become apparent from a consideration of ensuing description and accompanying drawings.

2. Reference Numerals
11 root rib
12 spars
13 short rib-lets that are placed between spars
14 hat section stringer
15 tip rib
16 pre-formed skin-molds
31 adhesive attachment surface
32 resin impregnated composite fiber tape or tow
40 tow placement machine
41 computer controlled motor
42 tow placement head
43 left end rotating axle
44 right end rotating axle
45 journal bearing
52 center wing box cell

DETAILED DESCRIPTION OF THE PREFFERED EMBODIMENT

Figure 1:
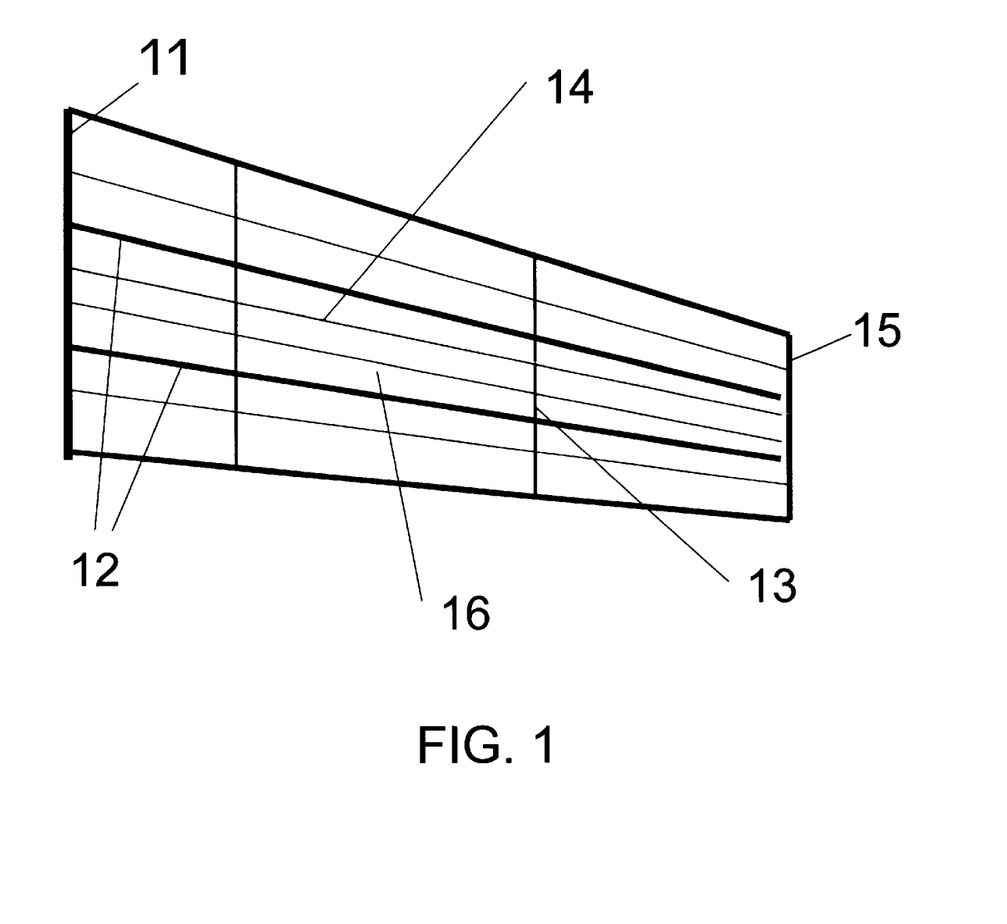
FIG. 1 shows the embodiment of a monolithic composite wing assembly.

Referring now to FIG. 1, which generally illustrates a typical embodiment of a monolithic composite wing assembly of an aircraft. The plan view of the semi-span wing shows a framework of plurality of U-channel shaped spars 12 and stringers 14 disposed in the longitudinal direction extending from the wing root to the wing tip. Similarly shaped rib-lets 13 are disposed in nearly perpendicular directions to said spars. In addition, several layers of pre-pregged composite tows 32 (shown in FIG. 3) comprising thousands of carbon or boron fibers are wrapped and adhesively bonded around and along plurality of mandrel-like wing box cells. Specific details of the drawings and the fabrication processes are described next.

Figure 2:
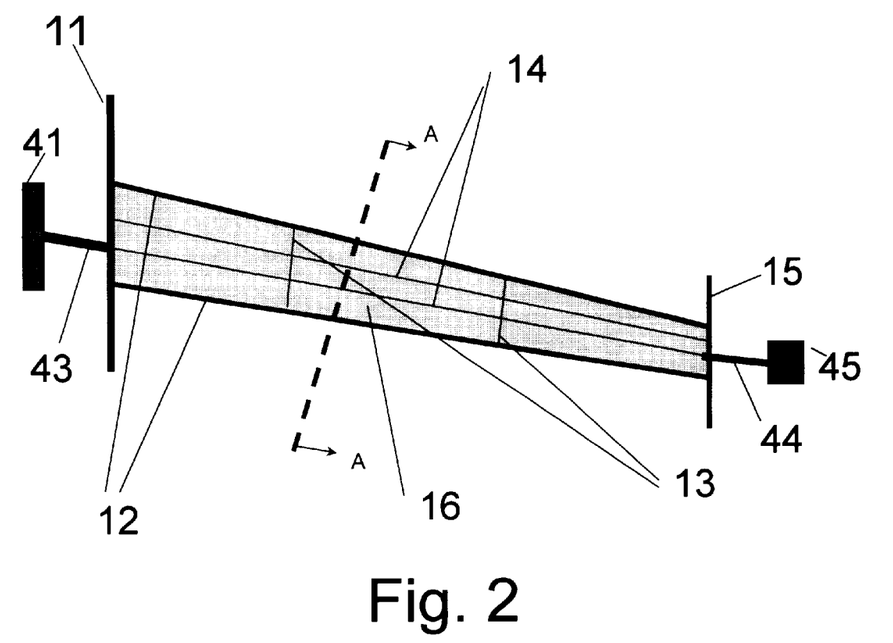
FIG. 2 shows an assembly of mandrel-like center wing box comprising of spars 12, rib-lets 13, top and bottom skin-molds 16 adhesively bonded together.

FIG. 2 illustrates one embodiment of the present invention that has a dual role of a mandrel as well as an integral member of a wing structure. A mandrel is a devise to provide an airfoil shaped wing surface. The prior arts uses specially made removable mandrels. Such mandrels are expensive to make and require extensive manual labor to assemble as well as to dismantle. To avoid such complex operations, the present invention employs mandrels that can be assembled on site and eventually become the integral part of the structure. The initial assembly begins with a framework of center wing box (cell) comprising a pair of spars 12 attached to a root rib 11 at the left end and a tip rib 15 at the right.

A rotatably mounted axle 43 is connected to said root rib, while at the right end another rotatably mounted axle 44 is connected to said tip rib. Said left end axle will be driven by a computer controlled motor 41, while said right end axle is simply supported on a journal bearing 45. Plurality of short rib-lets 13 are disposed laterally between said spars and glued by means of a chemical compound that hardens quickly at room temperature. A pair of pre-formed skin-molds 16 will be placed along the upper and lower surfaces of the spars and glued by means of said chemical compound. This assembly essentially represents the role of a mandrel.

Figure 3:
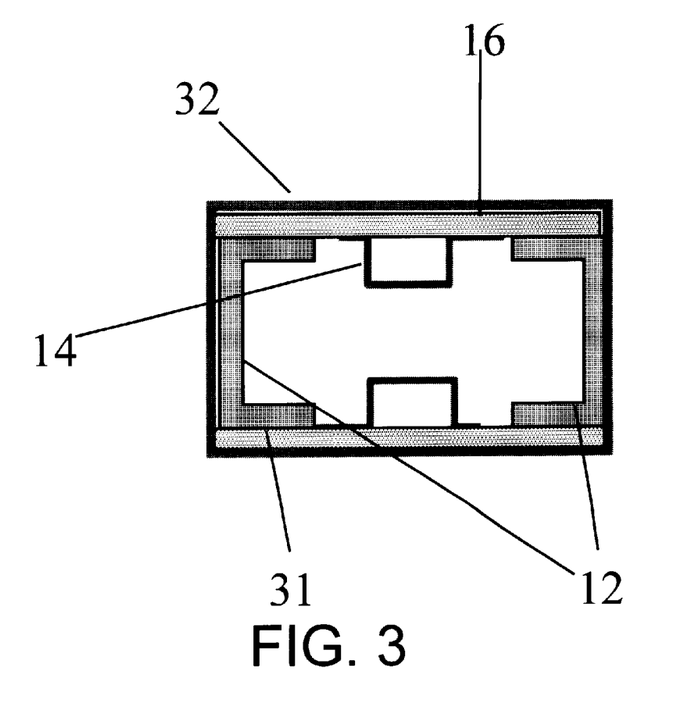
FIG. 3 shows the cross section view of the center wing box described in FIG. 2.

FIG. 3 shows the assembly of said mandrel-like center wing box comprising spars, rib-lets, and skin-molds. All the members of the framework are bonded by means of an adhesive chemical substance applied between contacting surfaces 31. The center wing box is then wrapped and bonded around by means of plurality of pre-pregged composite tapes 32 (also known as tows in the composite industry) that represent a collection of fine fibers having high tensile strength.

Figure 4:
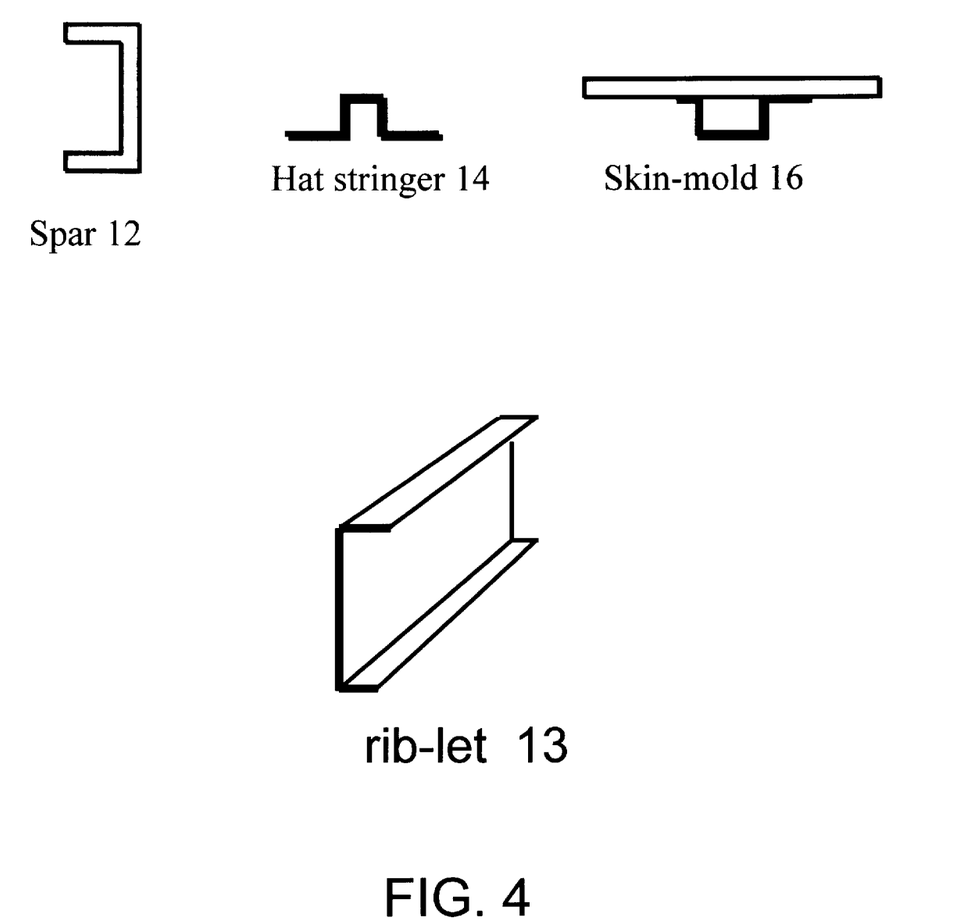
FIG. 4 shows pre-formed basic components such as spars 12, hat stringers 14 and skin-molds 16.

FIG. 4 shows the pre-fabricated parts such as spars 12, rib-lets 13, stringers 14, and skin-molds 16. These are the only three basic parts required to assemble said mandrel-like wing boxes.

Figure 5:
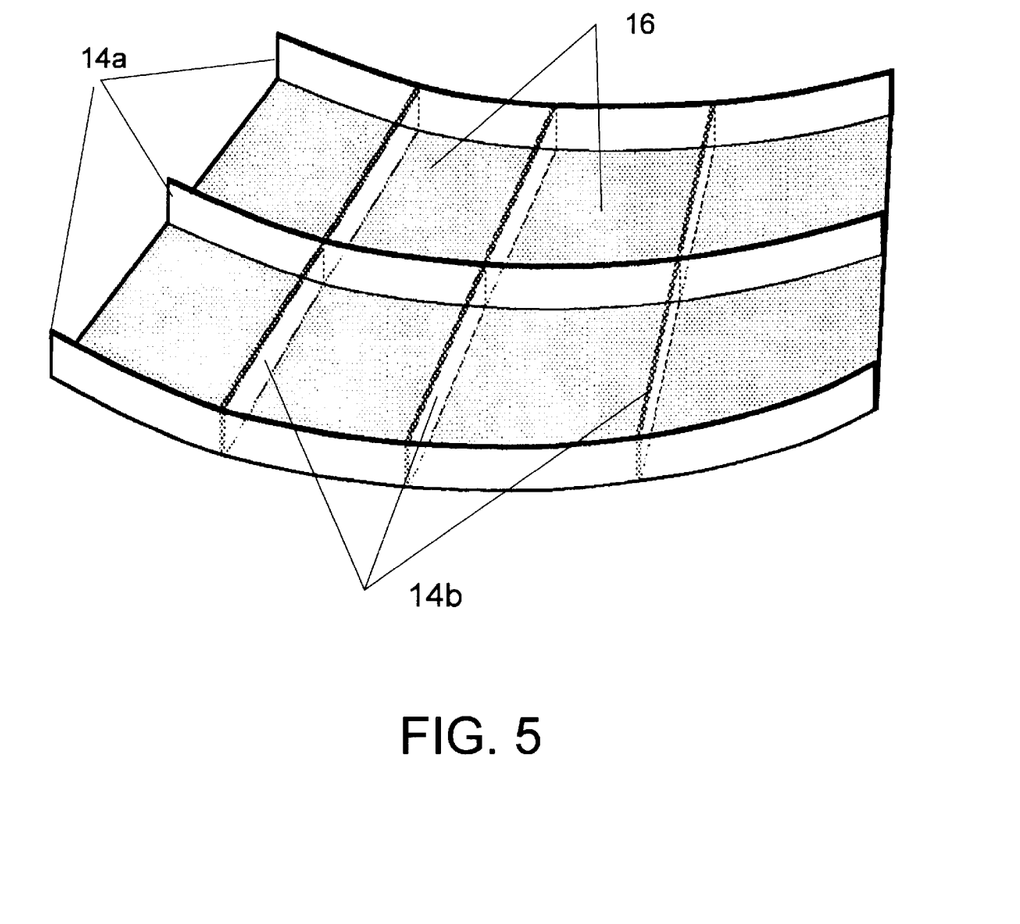
FIG. 5 shows the inside view of bendable composite skin molds consisting of longitudinal and lateral stringers.
Figure 6:
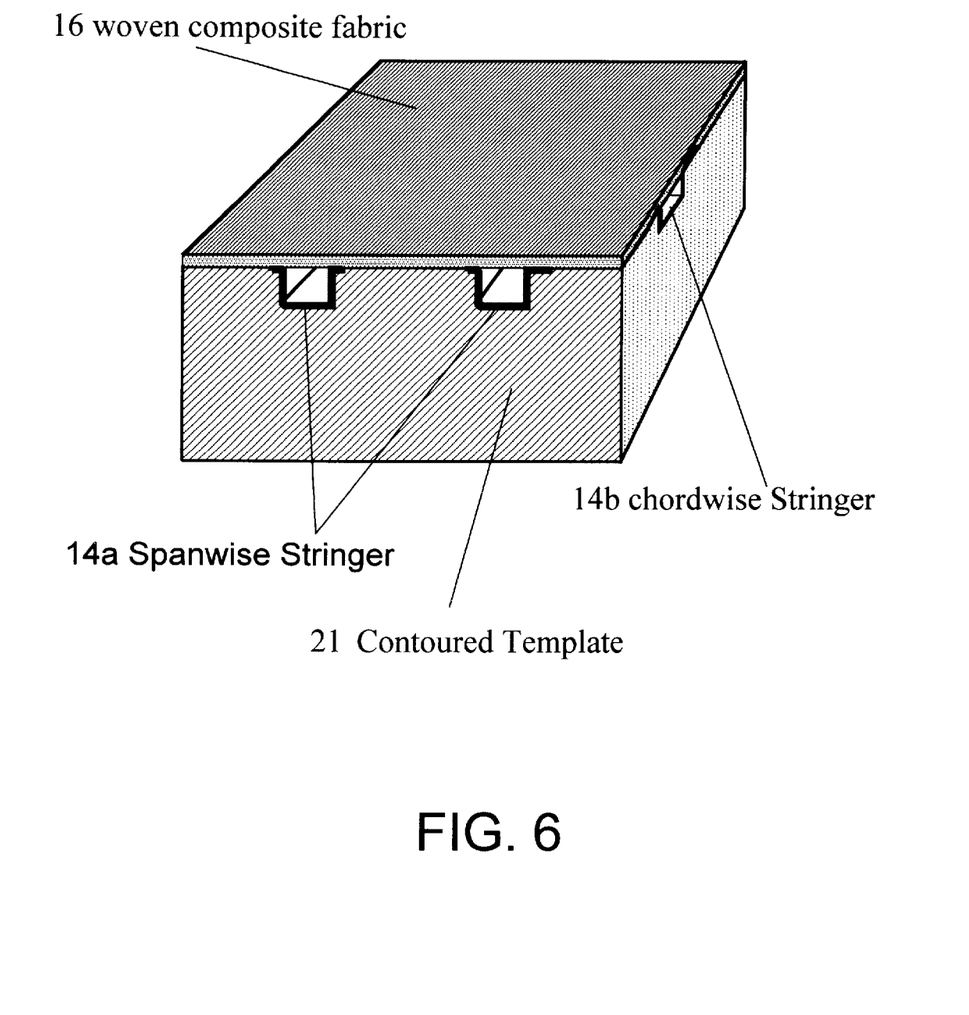
FIG. 6 shows a view of a template, which is used to make airfoil shaped skin-molds.

FIG. 5 illustrates a skin-mold assembly looking from inside of the wing box. This is another embodiment of this invention that is intended to provide a firm surface to withstand the pressure of the tow placement head during wrapping, compacting and bonding process of the composite tapes. The skin-molds are comprised of longitudinal stringers 14b, chordwise stringers 14a, and several layers of woven composite fabrics. FIG. 6 shows the female part of a template whose surface is contoured to represent the airfoil shape of the wing. This template can be made of either cast iron or ceramic material. In the female template, inverted hat shaped grooves are cut in span and chord directions to hold the stringers 14(a, b) flush with the template surface. The male part of the template is also contoured to the shape of the wing surface without any recesses (not shown).

Figure 7:
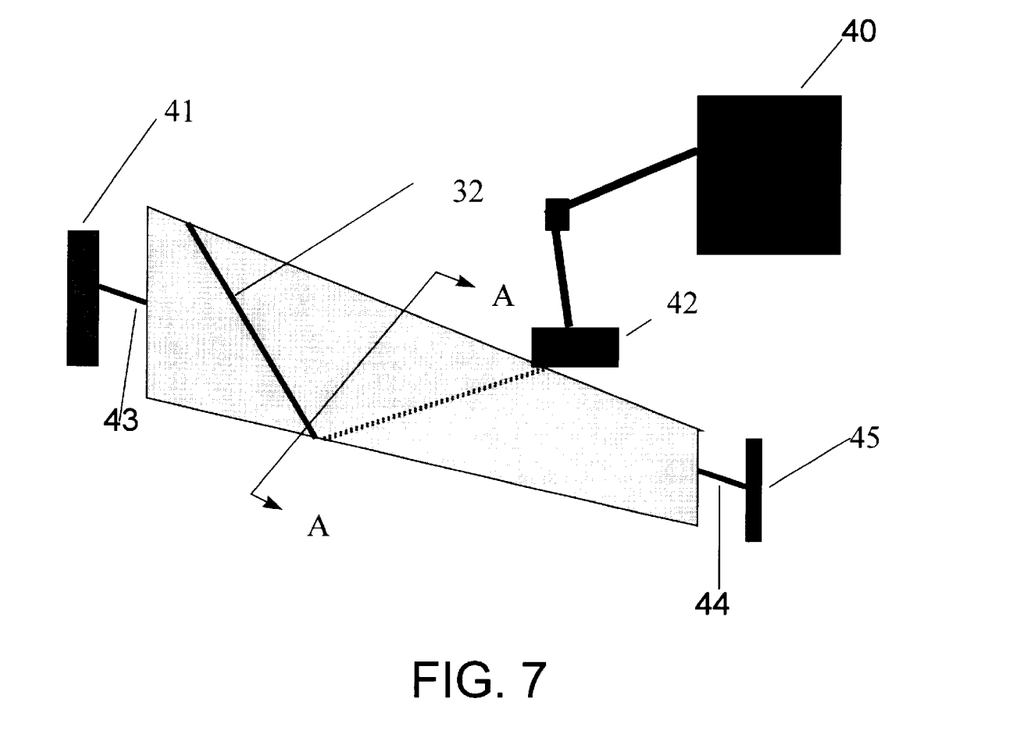
FIG. 7 shows an arrangement of a composite wing and a tape lay-up machine.

FIG. 7 shows the plan view of the tow placement assembly comprising of the wing box described in FIG. 2, the tow placement machine 40, and the tow placement head 42. The tow placement assembly may be arranged in two ways. Method 1: The tow placement machine can be mounted on a gantry hung from the roof while the wing assembly remains stationary on the shop floor but spins about said axles driven by a computerized motor. Method 2: The tow placement machine is anchored to the shop floor while the wing assembly unit traverses on a gantry also mounted on the floor. In either case there is a relative motion between the tow placement head unit and the framework of the wing box to wrap the tows in any desired path and desired number of layers.

FIG. 8 shows a progressive assembly stage of a multi-cellular wing box comprising of said spars, rib-lets and skin-molds. Said tow placement machine wraps and bonds the tows 32(b) around next pair of cells.

Figure 9:
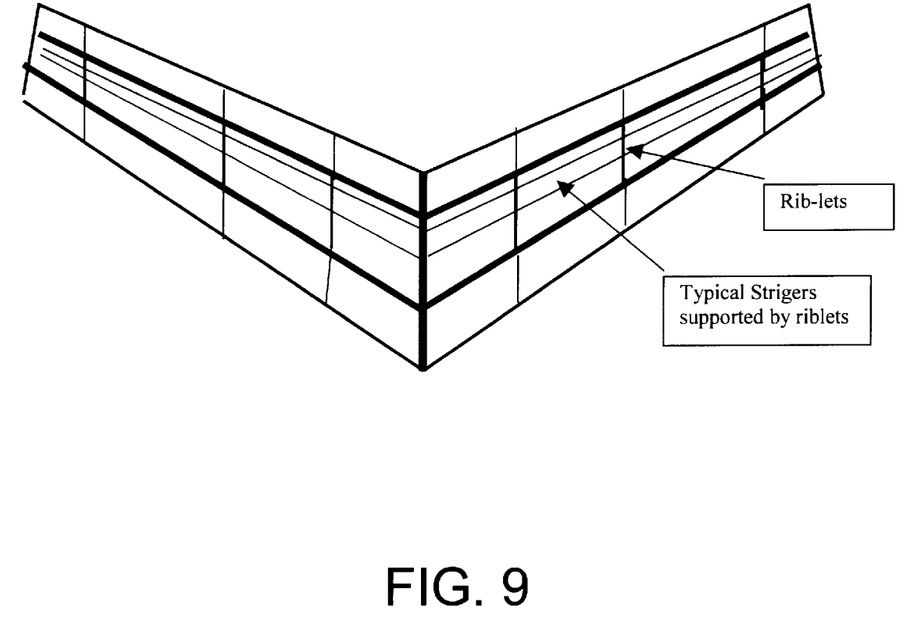
FIG. 9 shows the plan view of a carry through wing and monolithic fabrication process.

FIG. 9 shows the application of the monolithic composite wing manufacturing process for the carry-though wings. In this case, the wing remains fixed to a firm base at the plane of symmetry while the plurality of tow placement heads move around and along the wing span.

Figure 10:
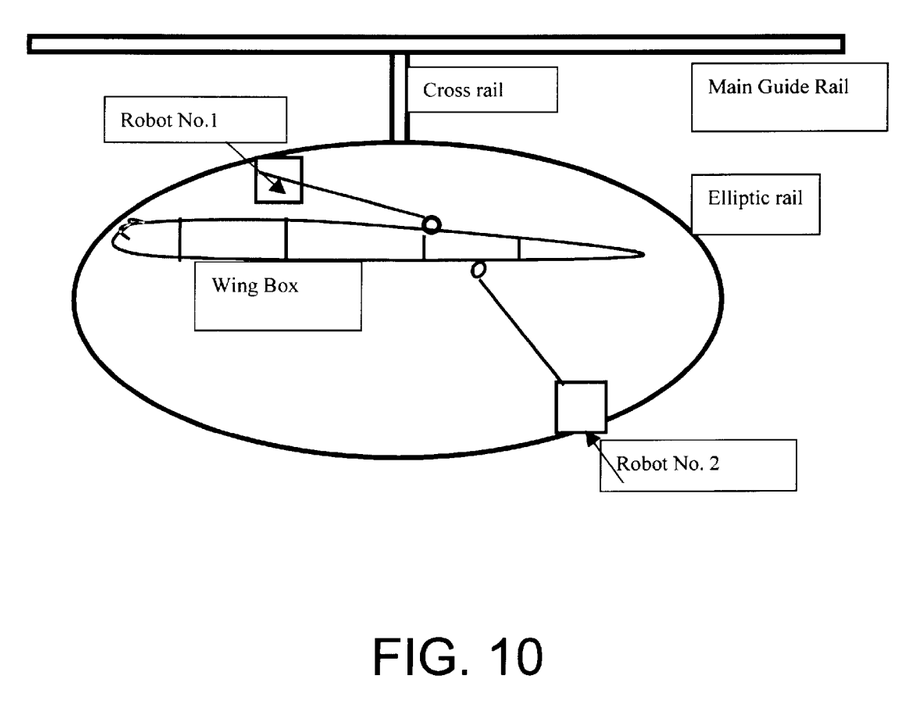
FIG. 10 shows a schematic arrangement of a suggested state-of-the-art tow placement machine for fabrication of carry through wings.

FIG. 10 shows a schematic outline of the tow placement heads that ride around an elliptic rail. This elliptic rail has the freedom to move in the chord direction, as well as, along the wing span. Two elliptic rails are used to place the tows on both sides simultaneously. Again two heads can be used to increase the rate of production. Details of this invention will be claimed in an independent PTO application.

The monolithic manufacturing process of composite wings according to the present invention consists of three major tasks such as; selection of pre-fabricated parts, fabrication of monolithic wing, and curing and inspection of finished assembly. A brief outline of these tasks is presented next.

Task I: Selection of Pre-fabricated Parts

The primary objective of this task is to procure subassembly parts shown in FIG. 3, such as, spars 12, rib-lets 13 and skin-molds 16, that are required for the assembly of all wing sets. These parts are generally mass-produced earlier for a given aircraft configuration using standard automated fabrication methods. For example:

Spars and rib-lets: U-channels are made from pre-fabricated tapered rectangular composite tubes. Tapered rectangular solid mandrels (not shown) are used to make these tapered rectangular tubes. Wall thickness, width and height are specified according to the design and the manufacturing process requirements. The tubes will be cut longitudinally along the centerline to form U-shaped spars and rib-lets. This is a well-known production process employed in the industry.

Skin-Molds: One of the primary embodiments of this invention is the construction of skin-molds 16 that replace conventional mandrels. Generally, to form a desired airfoil shaped wing surface solid mandrels are required. Such mandrels are expensive to make and extensive manual labor is required to install and remove after assembly, whereas, the present invention avoids the use of conventional mandrels. Instead an assembly of integral mandrels that become part of the structure is proposed. A typical skin-mold is illustrated in FIG. 5.

The objectives of the skin-mold are:
1. To provide airfoil shaped wing surface,
2. To withstand the pressure of compacting heads (42) during the tape laying process,
3. To enable monolithic fabrication of a wing in which continuous tow (32) placement procedure (FIG. 6) eliminates the need for mechanical fasteners,
4. To stiffen skin against compression and shear buckling loads.

The manner of fabricating said skin-molds is illustrated in FIG. 6. Two templates whose surfaces conform to the upper and lower wing surface mold-lines will be made of ceramic or cast iron blocks. A number of grooves in the shape of an inverted hat will be formed in the templates. One set of grooves run along the wing span which hold in position the longitudinal stringer (14a). These stringers are continuous from wing root to the tip. Another set of grooves run in the chordwise direction. These hold short discontinuous stringers 14b placed in between said longitudinal stringers. The upper surface of said hat stringers would be smeared with adhesive epoxy like resins using an automated procedure.

Next, a layer of woven fabric will be placed on the surface of the template and firmly pressed against the hat stringers using a similarly contoured male template (not shown). The woven fabric surface will be sprayed with adhesive resins and another layer of fabric will be placed, cut and pressed using an automated procedure. Likewise, the desired number of layers of woven fabric will be placed to form a skin-mold comprising of a grid work of hat shaped stringers and woven fabrics. Some wing skin-molds may use honeycomb sheets to carry heavy duty bending loads such as in civil and cargo aircrafts.

After drying the master skin-mold unit at room temperature, it will be cut into smaller panels that fit between the spars. The spacing of stringers and the number of layers of woven fabric will be determined by the stiffness required to withstand the compacting pressure of the tow placement head. Recent advances in structural adhesive technology enable the tow placement process to be performed with reduced compacting head pressure at room temperature. Having completed the inventory of parts, the assembly procedure is discussed next.

Task II: Fabrication of A Monolithic Wing

The fabrication process involves two major steps. First, assembling of a mandrel-like cell to render an airfoil shape to the upper and lower surfaces of the wing. In the second step, an automated tape laying machine wraps a resin impregnated tape around said cell, locally heats the tape, and compacts and binds the cell. Here, localized heating is used to melt the impregnated resin and compacting is used to glue the tape around the cell framework. Multiple layers of tapes in predetermined direction are used. These two steps will be repeated every time additional cells are added contiguously in the lateral direction to form a wing. An explicit fabrication procedure is described next:

Center Wing Box Assembly

The process begins with two center spars that are fixed firmly to the root rib 11 at the left-hand side and to the tip rib 15 at right hand side. Plurality of short rib-lets 13 are placed and adhesively bonded between spars at various span stations. At this stage all electrical conduits (if any), hydraulic pipelines and fuel lines (not shown) are fitted in place. Upper and lower skin-molds 16 will be glued to upper and lower surfaces of said spars as depicted in FIG. 3. Said spars; rib-lets and skin-molds will be adhesively fastened at typical surfaces 31. FIG. 3 shows a typical cross section view of the center wing box. In addition, the wetted side (the fuel side) of spars, ribs and skin-molds will be sprayed with a fuel leak-proof resistant polymer. Said mandrel-like wing box is then wrapped, compacted and bonded by means of a plurality of heated resin impregnated tapes 32a in predetermined angular directions.

Contiguous Wing Box Assembly

In subsequent operations, additional boxes, disposed on each side of the current framework, will be assembled as depicted in FIG. 8. Overlap wrapping and bonding of successive cells with locally heated impregnated tapes 32b in desired directions (longitudinal, lateral and helical paths) around and along the wing box will be continued. Overlap bonding provides increased torsion stiffness. A tow is a pre-pregged tape comprised of several thousands of unidirectional fine fibers (such as carbon, glass, kevlar or boron) surrounded by crystallized resin. The width of the tape may range from ⅛ of an inch to 4 inches. Wider tapes are preferred to increase the rate of fabrication.

The number of composite fabric layers to be placed on the mandrel is pre-determined by design. The tow placement machine 40 shown in FIG. 7 lays the tows around and along the mandrel. The tow placement machine is either fixed to the shop floor or mounted on an overhead gantry. If it is mounted on the overhead gantry, the tow placement head will move along the wing span. Otherwise, the wing box assembly will be permitted to traverse in the span direction. In either case, there exists a relative motion between the head and the wing. The wing rotates at required angular speeds to lay the tape around and along the wing box. The drive motor will be programmed to lay desired number of tows in helical paths and terminate at desired span stations.

Another embodiment of this invention is that the tow placement machine can be programmed to place reinforcing tows around inspection cutouts required in the wing. These reinforcements can be placed in different layers. Thus, the monolithic wing fabrication is made possible without the need of mechanical fasteners. The monolithic wings proposed in this invention are superior to the built-up structures in the aspects listed below:

1. Automation reduces manufacturing cost, and enhances production rate,
2. Composite material waste is eliminated,
3. Mechanical fasteners are avoided,
4. Structural integrity and durability have been enhanced due to avoidance of stress concentration factors,
5. Structural weight has been reduced due to monolithic construction,
6. Monolithic construction renders stiffer wing leading to enhanced aircraft flight maneuver performances, Box assembly and tow placement process continues successively until all spars are added to form a complete wing. The tow placement machine will be programmed to provide an additional function to open the cutouts after the final assembly.

Task III: Curing and Inspection

This is the final stage of the wing manufacturing process. Once the wing is fabricated, the assembly will be removed from the computer-controlled motor 41 and journal bearing 45. This unit will be moved to an autoclave where it will be pressurized and heated for several hours under a controlled environment. Since all cells are open, a pressure differential exists across the thickness of the layered composite material. Uniform pressure is applied at all places unlike in the case of a vacuum bagging system, which has the tendency to dimple due to blockage of air in the material. After curing, the wing will be removed from the autoclave and will be inspected for quality assurance certification.

Thus, the monolithic manufacturing process presented in this invention employs extensive automation compared to that proposed in the prior arts.

Conclusions, Ramifications, and Scope

Accordingly, the reader will see that this invention provides an economical process of manufacturing monolithic composite wings. In addition, the monolithic wing structures are more durable, lighter and yet stronger than the conventional built-up structures. This invention describes an on-site fabrication method of mandrels using pre-fabricated parts such said spars, rib-lets, and skin-molds. This mandrel is used as the basic structure to fabricate a unitized wing box comprising of plurality of contiguously wrapped and adhesively bonded impregnated composite tapes 32a and 32b. This fabrication process requires no mechanical fasteners. The angular direction of each tape is pre-determined so as to yield the best possible strength-to-weight ratio and the minimum weight of the wing box.

Interestingly enough, the mandrel fabrication method proposed in this invention is unique in that every element of the mandrel becomes an integral part of the wing. Therefore, the structural integrity and durability of monolithic wings are superior to those described in prior arts because, the present method eliminates the need of mechanical fasteners. In other words, monolithic wings will allow higher flutter speeds, higher divergence speeds and enhanced flight maneuver performances.

Although the description above contains some specificities, these should not be construed as limiting the scope of the invention but as merely providing illustrations of some of the presently preferred embodiments of this invention. Various other embodiments and ramifications are possible within it's scope. For example, a carry through wing fabrication can be performed in a similar manner in which the tow placement machine will be mounted on an overhead gantry and two tow placement heads ride on an elliptic rail around the wing. The tow placement heads have the freedom to move around the wing and along the wing span. A typical outline of this type of assembly is depicted in FIGS. 9 and 10. FIG. 9 shows an assembly of a carry through wing, while FIG. 10 depicts the concept of fiber placement. Additional extensions of the concept can be applied to the monolithic fabrication of fuselage, empennage, in-let ducts and engine thrust cones without using external mandrels which are expensive to make. Thus, the scope of the invention should be determined by the appended claims and their legal equivalents, rather than by the examples given.

I claim:

1. A method of manufacturing a monolithic composite wing comprising the steps of:

(a) fabricating a center wing box cell having a pair of longitudinally disposed U-shaped pre-formed spars, laterally disposed plurality of rib-lets between said spars, and a pair of resin impregnated wing skin-molds glued to upper and lower surfaces of said spars wherein said box cell is wrapped, compacted, and bonded by means of locally heated resin impregnated composite tapes in a plurality of layers along spanwise and helical directions; and (b) adjoining additional boxes contiguously disposed in the lateral direction on either side to form a framework, wherein wrapping, compacting, and bonding of said additional boxes includes overlapping the previously wrapped boxes in said framework by means of said locally heated resin impregnated composite tapes in a plurality of layers along spanwise and helical directions; and (c) repeating said fabrication procedure described in said step (b) until all boxes up to and including the leading edge and the trailing edge box cells of said wing are added; including (d) installing conduit devices for fuel, hydraulic systems and electrical services;

(e) spraying the inner surface of the wing box with fuel leak proof chemical compounds;

(f) providing inspection cutouts and placing reinforcement tapes around said inspection cutouts; and (g) curing said wing in an autoclave under controlled uniform pressure and temperature.

2. A method according to claim 1 in which contoured wing skin-molds are made of honeycomb sheets or a plurality of woven composite fabrics having integrally bonded hat shaped stiffeners disposed in longitudinal and lateral directions.

3. A method according to claim 1 in which an advanced tow placement device traveling along an elliptic shaped track places dual or multiple tapes simultaneously around the wing being able to traverse from the wing root to wing tip.

* * * * *